(12) United States Patent
Hallac et al.

(10) Patent No.: US 8,324,539 B2
(45) Date of Patent: Dec. 4, 2012

(54) WIDE WAVEGUIDE APPLICATOR

(75) Inventors: Abdulkadir Hallac, Plano, TX (US); William Wilber, Raleigh, NC (US)

(73) Assignee: Industrial Microwave Systems, L.L.C., Morrisville, NC (US)

( * ) Notice: Subject to any disclaimer, the term of this patent is extended or adjusted under 35 U.S.C. 154(b) by 394 days.

(21) Appl. No.: 12/670,692

(22) PCT Filed: Aug. 4, 2008

(86) PCT No.: PCT/US2008/072062
§ 371 (c)(1), (2), (4) Date: Jan. 26, 2010

(87) PCT Pub. No.: WO2009/020895
PCT Pub. Date: Feb. 12, 2009

(65) Prior Publication Data
US 2010/0200573 A1 Aug. 12, 2010

Related U.S. Application Data

(60) Provisional application No. 60/954,202, filed on Aug. 6, 2007.

(51) Int. Cl.
*H05B 6/70* (2006.01)
(52) U.S. Cl. .................................. 219/693; 438/222
(58) Field of Classification Search ................ 219/693; 438/222
See application file for complete search history.

(56) References Cited

U.S. PATENT DOCUMENTS

| | | | |
|---|---|---|---|
| 3,474,209 A | 10/1969 | Parker | |
| 4,035,599 A | 7/1977 | Kashyap et al. | |
| 5,278,375 A | 1/1994 | Berteaud et al. | |
| 5,400,004 A * | 3/1995 | Moeller | 333/252 |
| 5,457,303 A | 10/1995 | Shute et al. | |
| 5,958,275 A | 9/1999 | Joines et al. | |
| 6,652,709 B1 * | 11/2003 | Suzuki et al. | 156/345.41 |
| 6,737,619 B2 | 5/2004 | Seghatol et al. | |
| 6,888,115 B2 | 5/2005 | Drozd | |
| 7,470,876 B2 | 12/2008 | Drozd et al. | |
| 2004/0029339 A1 * | 2/2004 | Yamamoto et al. | 438/222 |
| 2007/0068939 A1 | 3/2007 | Harris | |

* cited by examiner

*Primary Examiner* — Phuc Dang
(74) *Attorney, Agent, or Firm* — James T. Cronvich

(57) ABSTRACT

A microwave waveguide applicator and a method for heating, drying, or curing generally planar materials or products. The applicator comprises a waveguide having a pair of opposing broad sides perpendicular to a pair of opposing narrow sides bounding a rectangular exposure chamber. A microwave source generates and propagates microwaves through the chamber in a propagation direction and with an electric field generally directed from one broad wall to the other. Slotted openings in the narrow sides act as entrance and exit ports for a conveyor transporting a product along a conveying path through the chamber perpendicular to the propagation direction and perpendicular to the electric field. The waveguide may be ridged to focus or bend the electric field, especially for heating thin materials.

19 Claims, 3 Drawing Sheets

WIDE WAVEGUIDE APPLICATOR

BACKGROUND

The invention relates generally to microwave heating, drying, and curing and, more particularly, to rectangular waveguide applicators and methods for exposing a generally planar, broad product area to microwave energy.

Rectangular waveguide applicators are used to heat, dry, and cure a variety of materials and products. In axial applicators, products to be exposed to microwave energy are conveyed along the length of the microwave applicator in or opposite to the direction of microwave propagation. But, with axial applicators, the width of the product that can be conveyed into the applicator is limited by the width of the waveguide. To overcome the width limitation of axial applicators, a rectangular waveguide slotted along its broad faces allows product to be conveyed through the waveguide along a path perpendicular to the direction of microwave propagation with the electric field generally in the plane of the product. The length of such an applicator can be made long to accommodate wide products. Because more microwave energy is absorbed by the product along the side closer to the source of microwave energy, heating is highly non-uniform in a single pass. Consequently, it is common to arrange a number of passes in a serpentine arrangement to make the heating across the width of the product more uniform. Serpentine applicators work well with thin wide materials or products. But, thick products or very damp products attenuate the microwave energy along the propagation path so much that most of the energy is absorbed by the product closest to the microwave source.

Thus, there is a need for a microwave applicator that can uniformly heat thick or damp wide products and materials.

SUMMARY

This need, as well as possibly other needs, is satisfied by a microwave applicator embodying features of the invention. One version of such an applicator comprises two pairs of opposite sides joined to form an exposure chamber that is elongated in a propagation direction from a generator end to a load end. The chamber has a cross section with a major axis and a shorter minor axis perpendicular to the propagation direction. A microwave source coupled to the generator end of the chamber supplies microwave energy propagating through the chamber in the propagation direction. The applicator terminates in a load at the load end. At least one side of the applicator has an opening to admit a product to be exposed into the exposure chamber along a path parallel to the major axis.

Another version of a microwave applicator comprises a rectangular ridged waveguide, defining an exposure chamber, coupled to a microwave source supplying microwave energy propagating through the chamber in a propagation direction. The waveguide includes a pair of opposed broad sides and a pair of opposed narrow sides bounding the exposure chamber. At least one ridge elongated in the propagation direction projects into the exposure chamber from at least one of the sides. An opening, elongated in the propagation direction, is formed in at least one of the narrow sides to admit a product to be exposed into the exposure chamber.

Yet another version of a microwave applicator comprises a microwave source supplying microwave energy to a rectangular waveguide. The microwave energy propagates along the waveguide in a propagation direction. The waveguide includes first and second pairs of opposed sides bounding an exposure chamber extending in the propagation direction. An opening, elongated in the propagation direction, is formed in at least one of the second pair of opposed sides to admit a planar product to be exposed into the exposure chamber in a plane parallel to the propagation direction. The electric field in the chamber is directed generally from one of the sides of the first pair to the other.

In still another aspect of the invention, a method for exposing a planar product to microwaves comprises: (a) propagating microwaves having a transverse electric field in the direction of propagation through a microwave exposure region; and (b) conveying a planar product along a conveying path perpendicular to the direction of propagation and perpendicular to the general direction of the transverse electric field through the microwave exposure region.

BRIEF DESCRIPTION OF THE DRAWINGS

These features and aspects of the invention, as well as its advantages, are better understood by referring to the following description, appended claims, and accompanying drawings, in which:

DETAILED DESCRIPTION

Figure 1:
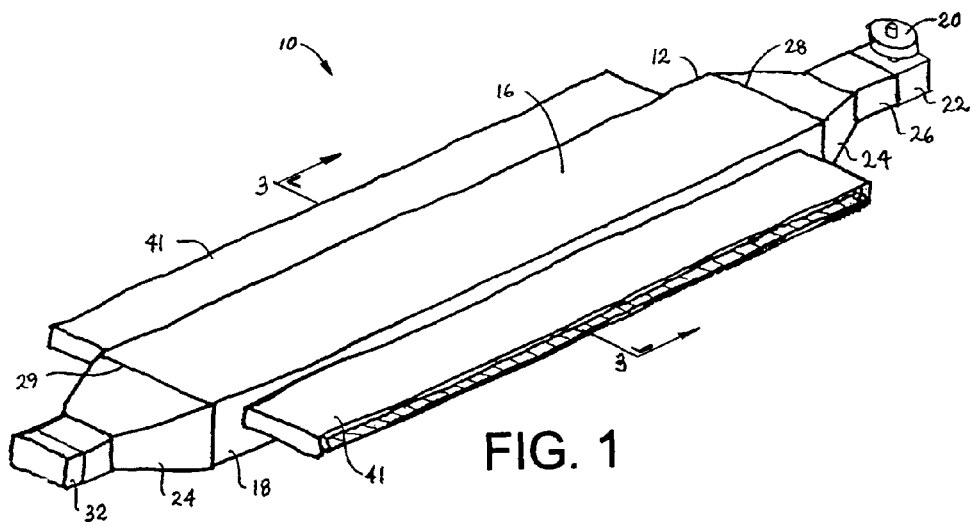
FIG. 1 is an isometric view of a rectangular microwave applicator embodying features of the invention.
Figure 2:
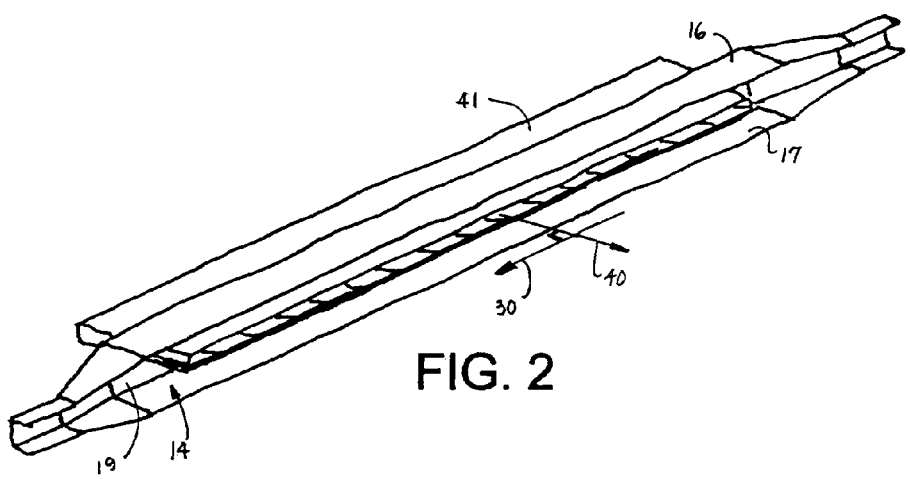
FIG. 2 is an isometric cutaway of the applicator of FIG. 1 split along its axis.
Figure 3:
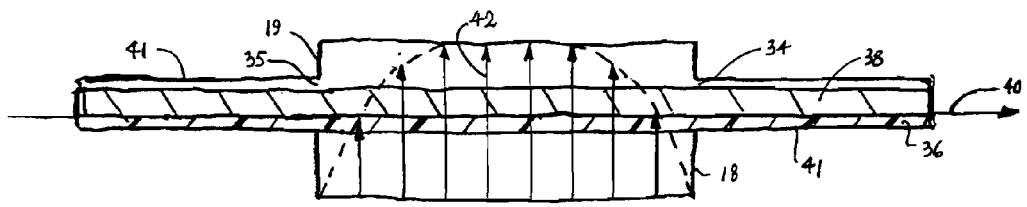
FIG. 3 is a cross section of the applicator of FIG. 1 taken along lines 3-3.

One version of a microwave applicator embodying features of the invention is shown in FIGS. 1-3. The applicator 10 includes a rectangular waveguide 12 whose interior is an exposure chamber 14 in which a product is exposed to microwave energy. The waveguide has two pairs of opposed sides—broad sides 16, 17 and narrow sides 18, 19. A microwave source 20, such as a magnetron operating preferably at one of the standard commercial frequencies of 915 MHz or 2450 MHz, generates microwaves that are injected into the exposure chamber through a launcher 22, a tapered waveguide section 24, and an intervening rectangular waveguide section 26. The microwaves propagate through the exposure chamber from a generator end 28 nearest the source to an opposite load end 29 in a propagation direction 30. A second tapered waveguide section 24 at the load end directs the microwave energy to a terminating load 32, such as a water load to absorb heat and act as a matched impedance for traveling wave operation. The tapered waveguides, like the matched impedance, reduce the incidence of microwave reflections in the chamber.

Slotted openings 34, 35, elongated in the propagation direction, are formed in the narrow side walls 18, 19 of the applicator. The slots serve as entrance and exit ports for a conveyor 36, such as a plastic or rubber conveyor belt relatively transparent to microwave radiation, that conveys generally planar materials or products 38 along a conveying path 40 through the exposure chamber. The products pass through pin choke tunnels 41 covering the slots. The choke tunnels extend outward of the narrow sides of the waveguide applicator and reduce the leakage of microwave radiation through the slots. The conveying path is transverse, preferably perpendicular, to the direction of microwave propagation and also to the direction of the electric field, whose flux lines 42 extend from one broad side to the other across the chamber preferably in the $TE_{10}$ mode with the magnitude of the field greatest midway between the narrow sides. Because the flux lines of the electric field produced by the microwaves propagating through the exposure chamber are generally normal to the plane of the product or product mat atop the conveyor, microwave energy is weakly coupled to and absorbed more gradually than if the product were being conveyed through the broad sides of the applicator and parallel to the direction 42 of the electric field. The gradual absorption results in a more uniform distribution of absorbed microwave energy along the product by preventing the majority of the microwave energy from being coupled into the product at the generator end of the chamber. (Thick, high-dielectric, or high-moisture materials are particularly susceptible to overheating at the generator end.) Furthermore, conveying the product parallel to the broad sides of the waveguide applicator allows a larger volume of product to reside in the exposure chamber at a given time. Because the energy is distributed fairly uniformly over a large area, voltage gradients within the chamber are smaller, which reduces arcing and may eliminate the need for a circulator to protect the microwave source from reflected energy during operation.

Figure 4:
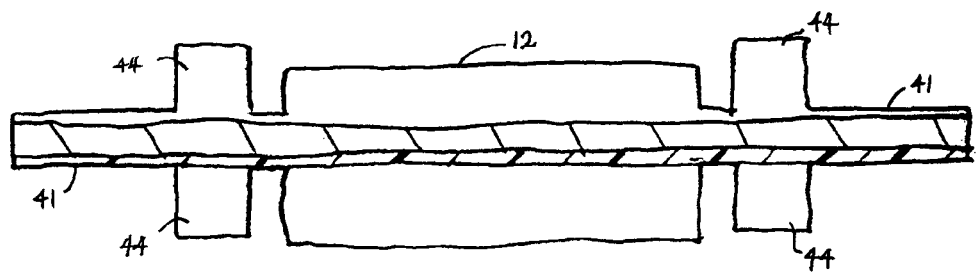
FIG. 4 is a cross section as in FIG. 3, but with side resonator chokes.

As shown in FIG. 4, the choke tunnels 41 may alternatively be supplemented with resonant choke cavities 44 to further attenuate leakage radiation. The resonant choke cavities may be formed on one or both sides (top and bottom) of the choke tunnels.

Figure 5:
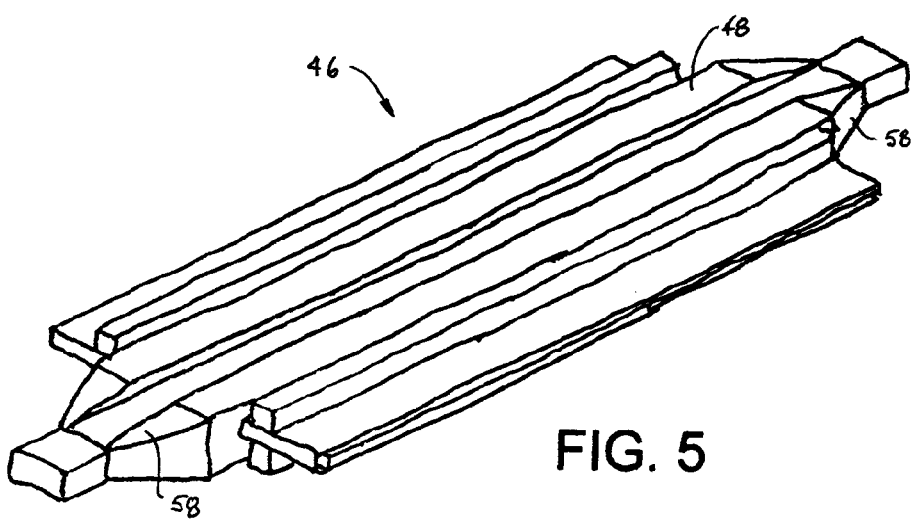
FIG. 5 is an isometric view of one version of a ridged waveguide applicator embodying features of the invention.
Figure 6:
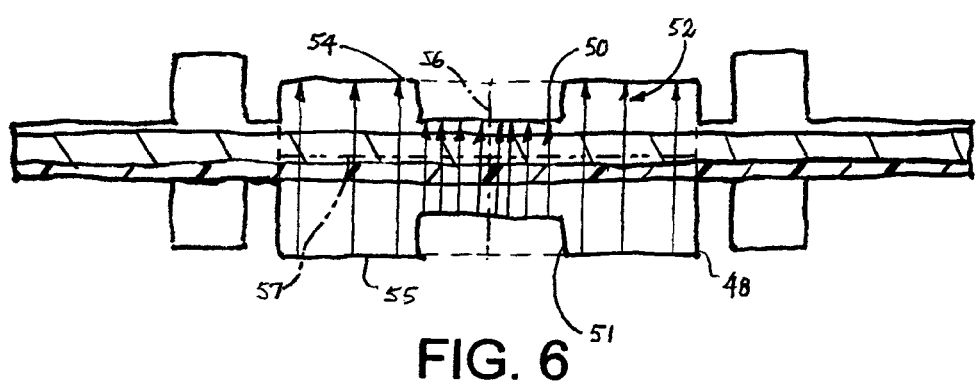
FIG. 6 is a cross section of the applicator of FIG. 5 taken along lines 6-6.

Another version of a microwave applicator is shown in FIGS. 5 and 6. While the applicator of FIG. 1 is designed to be used preferably with thick materials, e.g., materials thicker than about 2.5 cm, the applicator 46 of FIGS. 5 and 6 is adapted for thinner materials, e.g., material ranging in thickness from about 0.9 cm to about 2.5 cm. The applicator in FIG. 5 differs from the applicator in FIG. 1 primarily in that the waveguide 48 forming the exposure chamber is a ridged waveguide, shown with a pair of opposing ridges 50, 51 jutting into the exposure chamber 52 from the broad sides 54, 55 of the waveguide. The ridges shown are made by offsetting the walls forming the broad sides of the waveguide. The ridges, which are elongated in the microwave propagation direction, are centered on the minor axis 56 of the generally rectangular cross section of the exposure chamber midway between the narrow sides. The longer major axis 57 is midway between the broad sides. The electric field is concentrated between the opposing ridges of the chamber to form a high-density microwave exposure region that increases the coupling of microwave energy into the product. The central ridges also decrease the leakage of microwave energy through the entrance and exit ports. The ridges are also shown in FIG. 5 as extending into both tapered waveguide sections 58.

Figure 7:
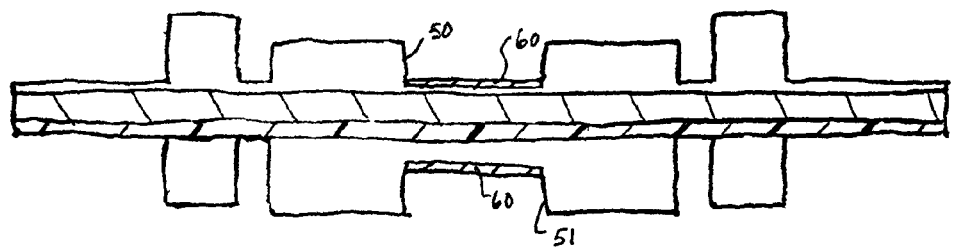
FIG. 7 is a cross section as in FIG. 6 with the addition of lossy conductive strips along the waveguide ridges.

The waveguide applicator of FIGS. 5 and 6 may alternatively be modified by adding a lossy conductive-material strip, or layer 60, along each ridge 50, 51, as shown in FIG. 7. The dielectric layer suppresses higher order electromagnetic-wave modes, such as $TE_{20}$, that tend to form in the two-lobe chamber.

Figure 8:
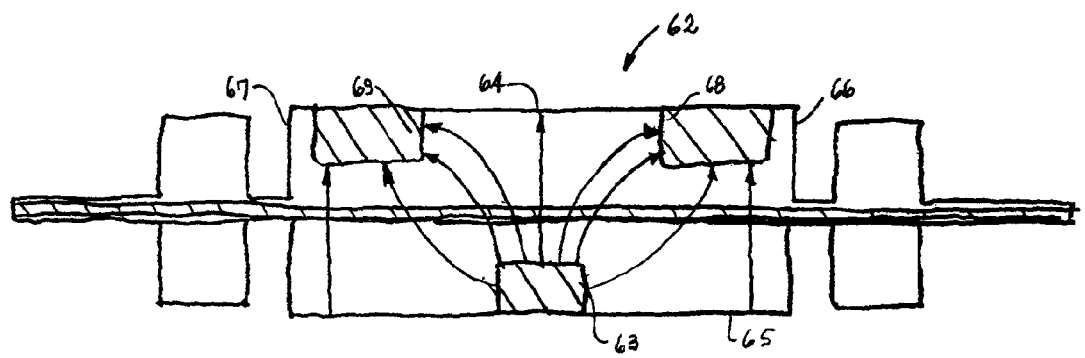
FIG. 8 is a cross section of a ridged waveguide as in FIG. 5 with ridges arranged to focus microwave energy on a relatively thin product.

The waveguide applicator of FIG. 8 is used preferably for thin materials, e.g., for materials less than about 2 cm thick. In this ridged-waveguide applicator 62, one ridge 63 extends into the chamber from a first broad side 65 of the generally rectangular waveguide. The conductive ridge, which is formed by a solid or hollow rectangular element fastened to the first broad side of the applicator, is positioned midway between the opposing narrow side 66, 67 of the waveguide. Protruding into the exposure chamber from the opposing broad side 64 is a pair of ridges 68, 69 positioned equally distant from the central ridge on the opposite broad side. The conductive ridges bend the electric field lines as shown in FIG. 8 to produce a component of electric field tangential to the plane of the material that couples much better to the thin material to heat it. The number, exact positions, widths, heights, and shapes of the ridges may be adjusted to obtain desirable heating effects for a variety of materials and dimensions.

Although the invention has been described with reference to a few preferred versions, other versions are possible. For example, the ridges may be formed as solid or hollow elements fastened to the inside walls of rectangular waveguide or as offsets in the walls in any of the versions described. As another example, the applicators could be operated with a single slotted opening for conveying a product into the exposure chamber. In such a construction, a product to be exposed is moved into and out of the chamber through the same slot. As another example, the ridges could be moved to the corners of the waveguide in contact with both the broad and narrow walls. So, as these few examples suggest, the scope and spirit of the claim is not limited to the preferred versions described in detail.

What is claimed is:

1. A microwave applicator comprising:
   two pairs of opposite sides joined to form an exposure chamber elongated in a propagation direction from a generator end to a load end and having a cross section with a major axis and a shorter minor axis perpendicular to the propagation direction;
   a microwave source coupled to the generator end of the exposure chamber to supply microwave energy in the form of a traveling wave propagating through the exposure chamber in the propagation direction from the generator end to the load end;
   wherein at least one of the opposite sides of one of the pairs of opposite sides has an opening to admit a product to be exposed into the exposure chamber along a path parallel to the major axis.

2. A microwave applicator as in claim 1 further comprising a conveyor and wherein the applicator has aligned slotted openings in opposite sides of one of the pairs to admit the conveyor into the exposure chamber to convey the product through the exposure chamber parallel to the major axis.

3. A microwave applicator as in claim 1 wherein the cross section of the exposure chamber is a rectangle.

4. A microwave applicator as in claim 1 wherein at least one of the sides has a ridge elongated in the propagation direction and extending toward the opposite side of the applicator.

5. A microwave applicator as in claim 1 wherein each side of a pair of opposite sides has a ridge elongated in the propagation direction and extending toward the opposite side.

6. A microwave applicator as in claim 5 wherein one of the sides has two ridges and the opposite side has a ridge equidistant from those two ridges.

7. A microwave applicator as in claim 5 wherein each side of a pair of opposite sides has a ridge elongated in the propagation direction and extending toward the opposite side along the minor axis.

8. A microwave applicator as in claim 1 further comprising a tapered waveguide section between the microwave source and the generator end of the applicator.

9. A microwave applicator comprising:
a rectangular ridged waveguide including:
   a pair of opposed broad sides and a pair of opposed narrow sides bounding an exposure chamber extending in a propagation direction;
   at least one ridge elongated in the propagation direction projecting into the exposure chamber from at least one of the sides;
   an opening elongated in the propagation direction formed in at least one of the narrow sides to admit a product to be exposed into the exposure chamber;
a microwave source coupled to the exposure chamber to supply microwave energy in the form of a traveling wave propagating through the exposure chamber in the propagation direction.

10. A microwave applicator as in claim 9 further comprising a conveyor and wherein the ridged waveguide has aligned slotted openings in the opposed narrow sides to admit the conveyor into the exposure chamber to convey the product through the exposure chamber along a path perpendicular to the propagation direction and between the opposed broad sides.

11. A microwave applicator as in claim 9 wherein the ridged waveguide includes opposed ridges formed on opposed broad sides extending into the exposure chamber between the opposed narrow sides.

12. A microwave applicator as in claim 9 wherein the ridged waveguide includes two ridges extending into the exposure chamber from one of the broad sides and a ridge equidistant from those two ridges extending into the exposure chamber from the opposed broad side.

13. A microwave applicator as in claim 9 wherein the ridged waveguide further includes a pair of lossy conductors extending into the exposure chamber in the propagation direction from the opposed broad sides generally midway between the narrow sides.

14. A microwave applicator comprising:
a rectangular waveguide including:
   a first pair of opposed sides and a second pair of opposed sides bounding an exposure chamber extending in a propagation direction;
   an opening elongated in the propagation direction formed in at least one of the second pair of opposed sides to admit a planar product to be exposed into the exposure chamber in a plane parallel to the propagation direction;
a microwave source coupled to the exposure chamber to supply microwave energy in the form of a traveling wave propagating through the exposure chamber in the propagation direction and having an electric field directed generally from one of the first pair of opposed sides to the other.

15. A microwave applicator as in claim 14 further comprising at least one ridge extending in the propagation direction and projecting into the exposure chamber from at least one of the first pair of opposed sides.

16. A microwave applicator as in claim 14 further comprising two ridges extending in the propagation direction and projecting into the exposure chamber from one of the first pair of sides and another ridge extending in the propagation direction and projecting into the exposure chamber from the other of the first pair of sides at a position equidistant from the two ridges to bend the electric field.

17. A method for exposing a planar product to microwaves, comprising:
propagating microwaves in the form of traveling waves having a transverse electric field in a direction of propagation through a microwave exposure region;
conveying a planar product along a conveying path perpendicular to the direction of propagation and perpendicular to the general direction of the transverse electric field through the microwave exposure region.

18. The method of claim 17 further comprising:
concentrating the electric field along the centerline of the planar product conveyed through the microwave exposure region.

19. The method of claim 17 further comprising:
bending the electric field along the planar product conveyed through the microwave exposure region from the general direction perpendicular to the conveying path to a direction oblique or parallel to the plane of the planar product.

* * * * *